United States Patent [19]

Bees et al.

[11] Patent Number: 5,658,013
[45] Date of Patent: Aug. 19, 1997

[54] FUEL TANK FOR VEHICLES FOR HOLDING AND DISPENSING BOTH A LIQUID AND GASEOUS FUEL THEREIN

[75] Inventors: William J. Bees, Wadsworth; Joseph J. Mascolino, Canton, both of Ohio

[73] Assignee: The Babcock & Wilcox Company, New Orleans, La.

[21] Appl. No.: 531,027

[22] Filed: Sep. 20, 1995

[51] Int. Cl.⁶ ............................................. B60P 3/22
[52] U.S. Cl. ................................. 280/831; 280/834
[58] Field of Search ............................. 280/830, 831, 280/832, 834

[56] References Cited

U.S. PATENT DOCUMENTS

| | | | |
|---|---|---|---|
| Re. 34,807 | 12/1994 | Schaub et al. | 123/276 |
| 1,177,007 | 3/1916 | Auerbacher | 296/37.13 |
| 1,860,531 | 5/1932 | Eberhard | 280/834 |
| 3,565,201 | 2/1971 | Petsinger | 180/54 |
| 3,608,660 | 9/1971 | Smith et al. | 180/54 B |
| 3,687,087 | 8/1972 | Yurkoski et al. | 280/832 X |
| 3,884,255 | 5/1975 | Merkle | 137/265 |
| 4,143,193 | 3/1979 | Rees | 428/35 |
| 4,359,118 | 11/1982 | Latter et al. | 180/54 B |
| 4,463,734 | 8/1984 | Akeroyd | 123/525 |
| 4,852,892 | 8/1989 | Reid | 280/834 |
| 4,923,768 | 5/1990 | Kaneko et al. | 429/19 |
| 4,988,580 | 1/1991 | Ohsaki et al. | 429/19 |
| 5,035,206 | 7/1991 | Welch et al. | 123/27 GE |
| 5,082,751 | 1/1992 | Reichner | 429/19 |
| 5,117,801 | 6/1992 | Schaub et al. | 123/575 |
| 5,139,002 | 8/1992 | Lynch et al. | 123/575 |
| 5,193,635 | 3/1993 | Mizuno et al. | 180/65.3 |
| 5,212,431 | 5/1993 | Origuchi et al. | 318/139 |
| 5,228,423 | 7/1993 | Oikawa et al. | 123/525 |
| 5,228,529 | 7/1993 | Rosner | 180/65.3 |
| 5,248,566 | 9/1993 | Kumar et al. | 429/19 |
| 5,249,637 | 10/1993 | Heidl et al. | 180/65.2 |
| 5,250,368 | 10/1993 | Golben et al. | 429/17 |
| 5,271,357 | 12/1993 | Hsu et al. | 123/23 |
| 5,327,987 | 7/1994 | Abdelmalek | 180/65.2 |
| 5,330,031 | 7/1994 | Hill et al. | 180/271 |
| 5,346,031 | 9/1994 | Gardner | 180/179 |
| 5,359,308 | 10/1994 | Sun et al. | 335/216 |
| 5,366,820 | 11/1994 | Tsutsumi et al. | 429/19 |
| 5,370,418 | 12/1994 | Pugh | 280/830 |
| 5,376,470 | 12/1994 | Sprouse | 429/19 |
| 5,443,578 | 8/1995 | Davis, Jr. | 280/834 |

FOREIGN PATENT DOCUMENTS 2-241826  9/1990  Japan ................... 280/831

*Primary Examiner*—Kevin Hurley
*Attorney, Agent, or Firm*—Daniel S. Kalka; Robert J. Edwards

[57] ABSTRACT

A dual-fuel tank assembly for vehicles employing internal combustion engines wherein the fuel tank is interposed within the vehicle frame as an integral portion thereof with the tank assembly having a plurality of cylindrical pressure tanks of composite material construction for containing gas fuel and the cylindrical tanks partially nested with the tank assembly housing to leave substantial space around the pressure tanks for storing liquid fuel therein.

16 Claims, 4 Drawing Sheets

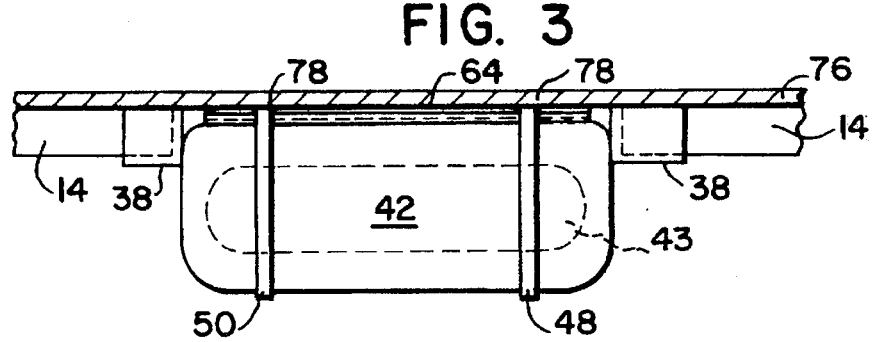
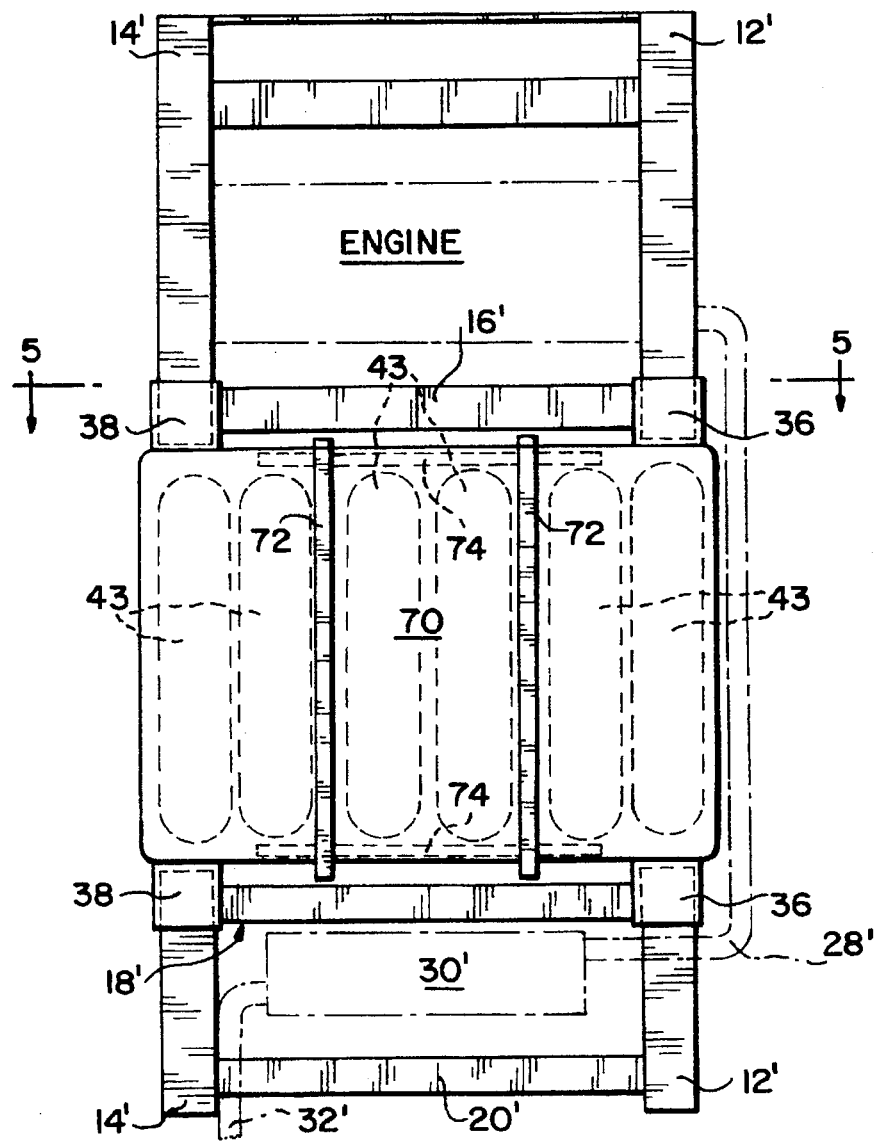

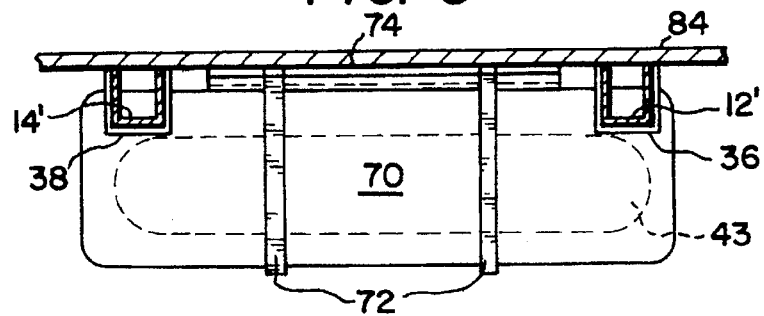
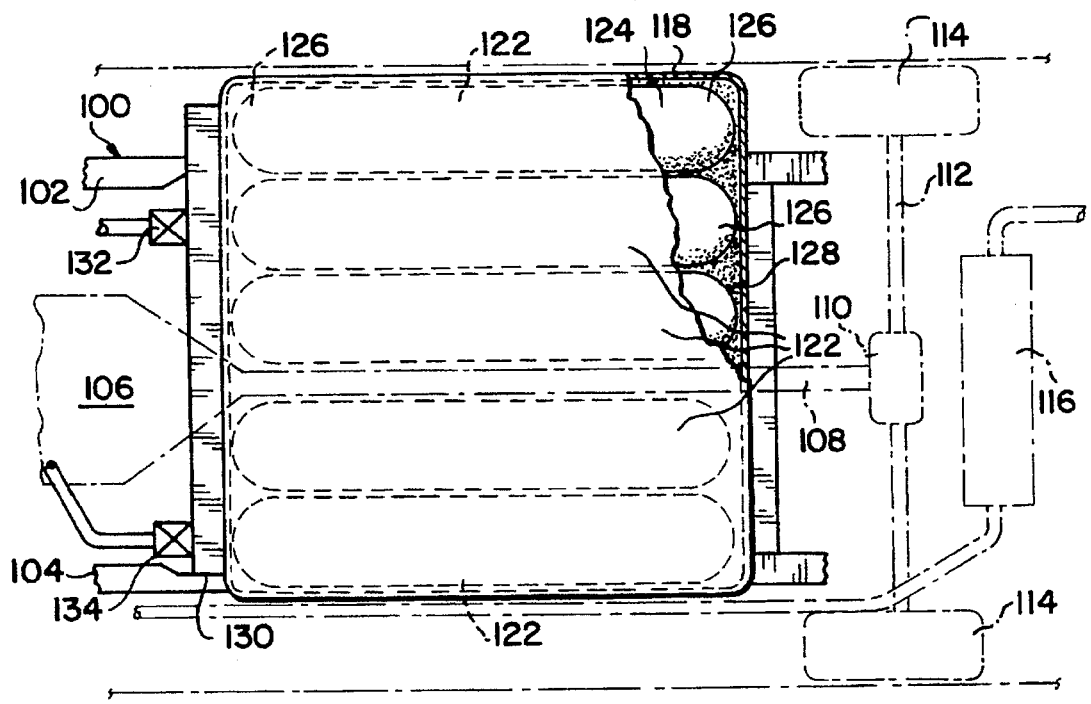
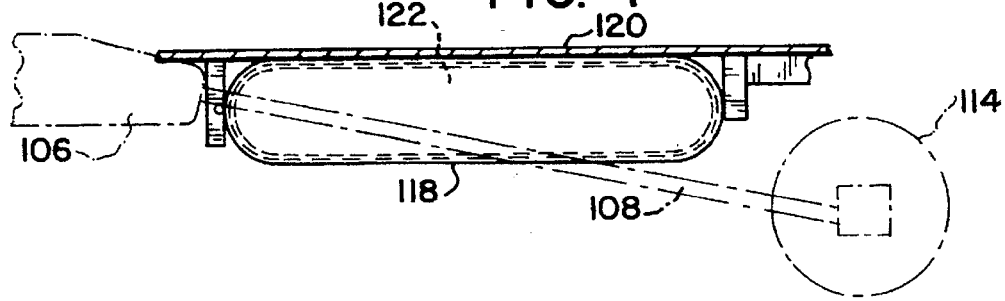

FUEL TANK FOR VEHICLES FOR HOLDING AND DISPENSING BOTH A LIQUID AND GASEOUS FUEL THEREIN

BACKGROUND OF THE INVENTION

1. Field of the Invention

The present invention relates generally to a fuel tank for receiving and maintaining fuel for a vehicle and in particular to a fuel tank which holds and dispenses both a liquid and a gaseous fuel.

2. Description of the Related Art

Modern transportation requires the extensive use of over-the-road vehicles such as automobiles, vans, trucks, and the like. Presently, such vehicles are powered by an engine which is fueled by gasoline or diesel fuel. The use of such fuels has given rise to two apparent shortcomings. First, such fuels are in limited supply throughout the world and the international control of such fuels causes their price and availability to be uncertain. A second shortcoming of such fuels is their adverse impact on the environment. It is well known that the hydrocarbon gases released from the combustion of gasoline or diesel fuel in an internal combustion engine are environmentally undesirable.

Natural gas exists in the United States in bountiful supply and the combustion of natural gas is environmentally compatible. Internal combustion engines can operate efficiently on natural gas. However, the use of natural gas as a vehicle fuel has been constrained by the "range" afforded the vehicle using such fuel. In the past, tanks of compressed natural gas have been placed in the trunk or other passenger/cargo carrying areas of the vehicle and interconnected with the fuel system for passage to fuel injectors or the like. However, the availability of storage areas in vehicles suitable for receiving such tanks of compressed natural gas is somewhat limited and such limitation necessarily constrains the distance that the vehicle can travel without refueling. Accordingly, the range of vehicles employing natural gas fuel has necessarily been significantly limited in the past.

The prior art is substantially devoid of the presentation of a vehicle having an internal combustion engine with fuel tanks provided as a structural portion of the vehicle to serve for holding both liquid and natural gas fuel for use by the engine. The requirement that the natural gas be introduced into the fuel tanks at high levels of pressure have typically dictated that the tanks be specially designed for simple retention in storage areas of the vehicle, and the prior art has not envisioned a manner for incorporating dual fuel tanks holding both gasoline and natural gas or any other liquid or gaseous fuel. The prior art has envisioned the use of natural gas as the fuel for vehicles as being more of a novelty feature for use by vehicle fleets serving a limited area, rather than an alternate fuel to the use of gasoline and diesel fuels which may be selectively used by the operator from a dual-fuel fired tank.

SUMMARY OF THE INVENTION

The present invention provides a dual-fuel vehicle fuel tank for containing and dispensing both a gaseous and a liquid fuel. This dual-fuel tank is unique in that its physical structure comprises a load-carrying member of the vehicle's structure. This feature enables the tank to be placed where it will not consume space on the vehicle which would normally be used for passengers and/or cargo while allowing adequate fuel carrying capacity to permit an economically viable vehicle range to be obtained.

The tank is comprised of some number (depending upon vehicle size and/or configuration) of cylindrical compressed gas containers, to contain a gaseous fuel such as natural gas. These are affixed into a sealed structure (outer tank). These exterior of the compressed gas cylinders lie within the sealed structure (outer tank) which also can contain a liquid fuel therein, such as gasoline. The compressed gas tanks are fastened within the sealed structure (outer tank) to prevent their relative movement and to prevent detrimental displacement during impact such as during a collision. The space exterior to the compressed gas cylinders but within the sealed structure (outer tank) may contain other necessary apparati such as fuel pump(s) and/or gauge equipment.

This invention addresses the problem of limited range and limited availability of refueling sites for alternative gaseous fuels by allowing a dual-fuel mode to exist simultaneously on the vehicle. For example, a vehicle can operate on a less polluting (lower emission) gaseous alternative fuel while driving within an urban area and switch to the more polluting (higher emission) but more readily available liquid fuel if either the gaseous fuel is depleted before a suitable re-fueling site is reached or the vehicle is driven out of the urban area where the air emission standards are higher. It will be seen that one aspect of the present invention is to provide a dual-fuel tank for vehicles providing significantly extended travel range over prior art natural gas fuel tanks.

Another aspect of the present invention is to provide a dual-fuel tank for vehicles in which the tank is formed as an integral and structural element of the vehicle frame.

Still a further aspect of the present invention is to provide a gaseous and liquid fuel tank for vehicles which is easy to construct and conducive to implementation with presently existing vehicles by retrofitting the same, and to new vehicles as a new assembly.

An additional aspect of the present invention is to provide a dual fuel tank wherein a number of compressed gas tubular (or other configuration) fuel tank of high pressure are maintained within a fuel tank outside housing which forms an integral and structural element of the vehicle frame with the space between the compressed gas tanks and the internal walls of the dual-fuel tank holding liquid fuel such as gasoline.

Still a further aspect of the invention is to provide a dual-fuel tank for vehicles wherein a plurality of high pressure tanks are interconnected with a common manifold and maintained within the tank housing to form a structural element of the vehicle frame.

The various features of novelty which characterize the invention are pointed out with particularity in the claims annexed to and forming a part of this disclosure. For a better understanding of the present invention and the operating advantages attained by its uses, reference is made to the accompanying drawings and descriptive matter in which a preferred embodiment of the invention is illustrated.

BRIEF DESCRIPTION OF DRAWINGS

In the drawings:

FIG. 3 is a side elevational view, in partial section, taken along the line 3—3 of FIG. 2;

FIG. 4 is a bottom plan view of a front-wheel drive vehicle showing the implementation of another embodiment of the dual-fuel tank of the present invention;

FIG. 5 is an end elevational view, in partial section, of the embodiment shown in FIG. 4 taken along the line 5—5;

FIG. 6 is a top plan illustrative view of the preferred embodiment of the invention wherein a plurality of cylindrical composition tanks are maintained in a single tank housing of a rear wheel drive vehicle;

FIG. 7 is a side elevational view of the embodiment shown in FIG. 6;

DESCRIPTION OF THE PREFERRED EMBODIMENT

Figure 1:
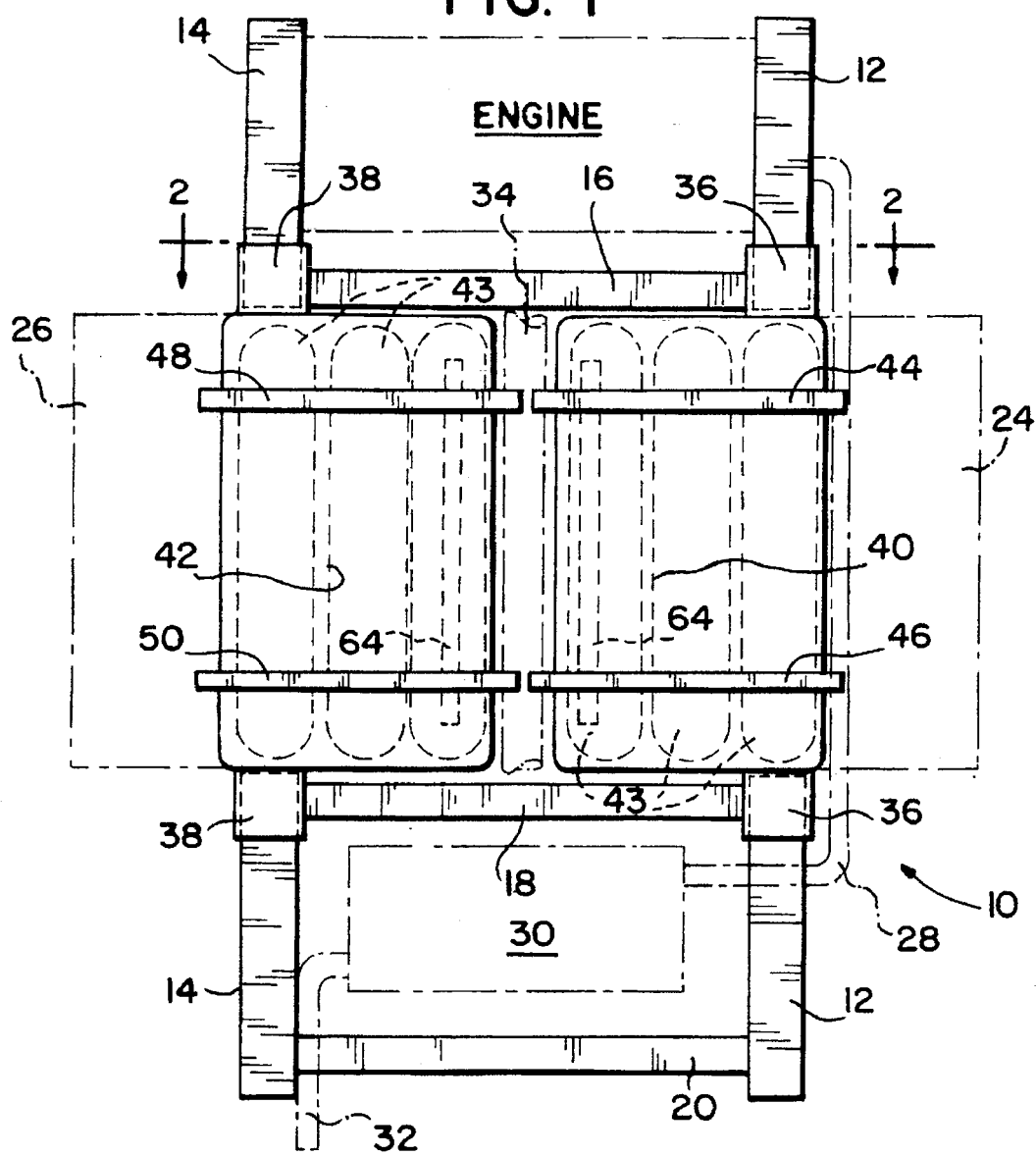
FIG. 1 is bottom plan view of a rear-wheel-drive vehicle showing an embodiment of the dual-fuel tank of the present invention.

Referring now to the drawings and first to FIG. 1, it can been seen that a vehicle frame of the rear-wheel-drive type is designated generally by the numeral 10. The frame 10 includes a pair of side rails or members 12, 14 which are interconnected by spaced apart laterally extending cross members 16, 18, 20. Right and left step wells 24, 26 may be provided along each side of the vehicle frame 10 in standard fashion. Also included as a portion of a typical vehicle is an exhaust pipe 28 extending along a side of the frame 10 to interconnect with a muffler 30 from which extends a tailpipe 32. In somewhat standard fashion in a rear-wheel-drive vehicle, a drive shaft 34 extends centrally along the bottom of the frame 10 between a transmission and a differential assembly.

According to one embodiment of the invention, a pair of dual-fuel tanks 40, 42 are fixed beneath the vehicle frame 10 and caused to be an integral portion thereof. The tanks 40, 42 are preferably of stainless steel construction and design which will allow the weight of the tank to be within reasonable limits for a motor vehicle and to preclude corrosion due to the fuels carried and the environment in which the tank assembly will perform. Advanced materials such as fully-composite or fiberglass reinforced materials could also be used. Inside each tank 40, 42 are a number of compressed gas cylinders 43 again manufactured from fully-composite or fiberglass—reinforced cylinders which may be aluminum or plastic lined. These cylinders are manifolded in a known manner to allow them to be selectively switched by the vehicles operator to supply gaseous as the primary vehicle fuel. The space 45 between the tanks 43 and the inner walls of tanks 40, 42 are filled with a second different fuel such as gasoline. Clearly, diesel fuel or liquified petroleum gas could also be employed. There are known valve means provided to allow the vehicle operator to selectively switch to this secondary fuel for vehicle operation under selected conditions, or when the primary fuel runs out.

Figure 2:
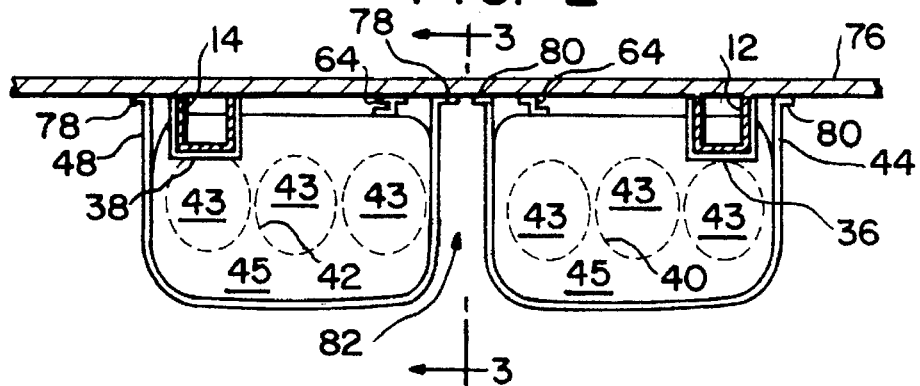
FIG. 2 is an end elevational view, in partial section, taken along the line 2—2 of FIG. 1.

In standard vehicle construction, each of the side rails or members 12, 14 are of continuous length. However, according to the instant invention, the side rails 12, 14 are removed at the area receiving the tanks 40, 42, and are structurally replaced by the tanks themselves. As shown in FIGS. 1–3, the overlay frame channel members 36 are welded to or otherwise form an integral portion of the tank while the overlay frame channel members 38 are similarly made an integral portion of the tank 42. The overlay channel members 36, 38 are then received upon respective end portions of the side rails or frame members 12, 14 and welded thereto. The actual welding and affixing of the frame overlay channel members 36, 38 to the frame members 12, 14 and tanks 40, 42 would be readily perceived and appreciated by those skilled in the art.

It will be appreciated that the instant invention contemplates the channel members 36, 38 receiving the side rails or frame members 12, 14 therein, as shown in the drawings. However, it is also envisioned that the channel members 36, 38 may be received within the channels defined by the side rails 12, 14. In either event, it will be understood by those skilled in the art that the continuous extension of the side rails 12, 14 is effected by the interpositioning of respective tanks 40, 42 which, through the provision of the frame overlay channel members 36, 38 attains side rail construction which is continuous and integral with the tanks 40, 42. Of course, the extent of overlap between the members 36, 38 and the respective side rails 12, 14 determines, to some degree, the overall integrity of the frame assembly 10.

If necessary, the junction of the overlap between the channel members 36, 38 and side rails 12, 14 may be further strengthened by implementing a plate bridging the junction and being affixed to each of the associated channel members 36, 38 and side rails 12, 14. It has been found that a metal stock plate having a thickness on the order of 0.25 inch may be bolted or otherwise secured over the junction for such purposes. Those skilled in the art will appreciate that the side rails 12, 14 are fabricated of steel and have a thickness of approximately 0.125 inch and, accordingly, the channel members 36, 38 are preferably constructed of similar material.

Also presented as an optional portion of the invention, and adding additional support to the tanks, are straps 44, 46, 48, 50 which are secured to the floor 76 of the vehicle. As shown in FIG. 2, the strap 44 is provided with legs or flanges 80 at the ends thereof, while legs or flanges 78 are provided at the ends of the straps 48. Of course, the straps 46, 50 would have similar flanges at their ends. The flanges 78, 80 may be welded, bolted, or otherwise affixed to the floor 76 of the vehicle, providing further support to the tanks 40, 42.

With further attention to FIGS. 2 and 3, it can be seen that an angle iron 64 is welded or otherwise appropriately attached along the length of each of the respective tanks 40, 42 and is also welded or otherwise appropriately attached to the floor 76. Those skilled in the art will now readily appreciate that the dual-fuel tanks 40, 42 are not only rendered as an integral portion of the side rails or members 12, 14, but are also rendered as an integral portion of the floor 76, as well. Accordingly, although the side rails or members 12, 14 appear to be discontinuous as a result of the insertion of the tanks 40,42, the presence of the tanks 40, 42, made of heavy gauge metal as aforesaid, provides increased strength and integrity to the vehicle frame 10.

It is further presented that the tanks 40, 42 are of non-circular cross section. By providing such tanks with a substantially rectangular cross section, the volume of the tanks is maximized for the space allotted to liquid fuel contained around the gas fuel cylinders 43. Preferably, the edges of the tanks 40, 42 are rounded, as shown.

With reference now to the preferred embodiment in FIGS. 4 and 5, it can be seen that the invention is readily implemented with front-wheel-drive vehicles. Here, vehicle frame slide rails or members 12', 14' are interconnected with cross members 16', 18', 20', with an exhaust pipe 28', muffle 30', and tailpipe 32' provided in ordinary fashion. Since no drive shaft is required for the front wheel drive vehicle, a single dual-fuel tank 70, of substantial size, is employed. Thus, more natural gas tanks 43 and secondary fuel may be located therein. Again, in the preferred embodiment of the invention the structure of the tank 70 would be similar to the of the tanks 40, 42, using substantially the same materials, welding techniques, and the like to assure the necessary structural integrity and ability to withstand the pressures aforesaid. Known manifolding and selective fuel switching would also be similar to that described for tanks 40, 42.

As shown in FIGS. 4 and 5, frame overlay channel members 36, 38 are again welded to the tank 70 and to respective side rail members 12', 14'. In this instance, the tank 70 not only provides for a continuity of the respective side rail members 12', 14', but also serves to interconnect them as well. Additionally, straps 72 are affixed to the floor 84 of the vehicle as by welding, bolting, or the like, and also serve to provide vertical support for the tank 20. Also included are angle irons 74 traversing center portions fore and aft of the tank 70, the same being welded to both the tank 70 and to the floor 84. Accordingly, the tank 70 is an integral portion of not only the side rails 12', 14' of the frame, but also can provide strength and rigidity to the floor 84 in this manner interconnecting the floor 84 with the remainder of the vehicle frame.

As presented above, the frame overlay channel members 36, 38 may be of such nature as to receive the respective ends of the side rails 12', 14', or they may be so configured as to be received within the channels of the side rails 12', 14'. Both concepts are envisioned as a portion of the instant invention.

Those skilled in the art will readily appreciate that the instant invention may be applied to preexisting vehicles, as well as new ones. In the event that an existing vehicle is to be converted for use of natural gas, for example the old fuel tank may be removed, the side rails or members 12, 14 removed at appropriate areas, and the appropriate tank 70 or tanks 40, 42 be placed beneath the vehicle frame 10 and secured to the side rails 12, 14 or 12', 14' as discussed above. For implementation with new vehicle manufacture, it is contemplated that the side rails 12, 14 and 12', 14' will be manufactured with the appropriate spacing therebetween to receive the appropriate tanks and frame overlay channel members 36, 38 as just presented.

By manufacturing the tanks of metal or of composite material as mentioned above, the tanks can serve not only as frame members for the vehicle, but are also of sufficient strength to be resistant to impacts from crashes or the like. Accordingly, the instant invention provides for structural vehicle integrity, enhanced safety, environmental compatibility, and an increased range of travel in the operation of a vehicle powered by an internal combustion engine.

As shown in FIGS. 6 and 7, a vehicle frame for a rear wheel drive vehicle is designated generally by the numeral 100. As presented above with respect to FIGS. 1-5, the vehicle frame 100 includes appropriate side rails or members 102, 104 with necessary cross members as is well understood and appreciated by those skilled in the art. In the embodiment of FIGS. 6 and 7, the engine 106 is interconnected by means of a drive shaft 108 to a differential 110 at the rear of the vehicle. The axle 112 extends from the differential 110 into driving interconnection with the rear drive wheels 114. Of course, an appropriate muffler 116 and other portions of the exhaust system and the like are maintained beneath the vehicle as shown.

According to the invention, a dual-fuel tank housing 118 of advanced composite material or other suitable construction such as fiber reinforced fiberglass is mounted in identical fashion to the fuel tanks described above with respect to FIGS. 1-5. In other words, the fuel tank housing 118 becomes an integral portion of the vehicle frame and interconnects with the side rails or members 102, 104 as previously discussed. It will, of course, be appreciated that with the drive shaft 108 passing from the engine 106 to the differential 110, and with the fuel tank housing 118 being interposed therebetween, accommodation must be made for passage of the drive shaft 108. In this regard, either dual tanks may be provided as described above with respect to FIGS. 1 and 2, or the fuel tank housing 118 may be configured with an appropriate recess or the like to accommodate passage of the drive shaft 108. In any event, the fuel tank housing (or housings) 118 interconnect with the frame members 102, 104 and is appropriate welded or otherwise interconnected and affixed to the vehicle floor 120 as earlier presented herein.

The compressed gas used in association with the dual-fuel tank housing 118 has a plurality of cylindrical tanks 122. Each of the tanks 122 is similar to the tanks 43 described earlier and has a cylindrical body member 124 and hemispherical end caps 126.

The cylindrical tanks 122 like the tanks 43 are preferably constructed of a composite material as commonly used for pressure vessels. Such are sufficient to maintain the pressure presented above. Fiber reinforced composite materials such as graphite, carbon, or boron composites are suitable for implementation with the instant invention. Similarly, filament would structures as presently employed as pressure vessels would also suffice. Fiber reinforced plastics such as fiberglass would, indeed, provide sufficient strength to accommodate the high pressures necessary in a compressed gas fuel tank.

The cylindrical tanks 122 and the tanks 43 are preferably nested or otherwise retained within the fuel tank housing 118 as will be described in more detail with reference to FIG. 10. Nest 128 is provided to receive and maintain the cylindrical tanks 122. The nest 128 comprises spaced bands having troughs for receiving and securing the tanks 122 in place. Liquid fuel is contained in the open area around the nest bands 128 and provides an alternate fuel to the vehicle in a manner as described earlier.

An appropriate manifold 130 is provided in interconnection with each of the cylindrical tanks 122 and 43. Accordingly, a single inlet valve 132 may be interconnected with the manifold for charging the cylindrical tanks 122, while a single outlet valve 134 may be interconnected with the manifold to pass the gaseous fuel to the engine 106.

Figure 8:
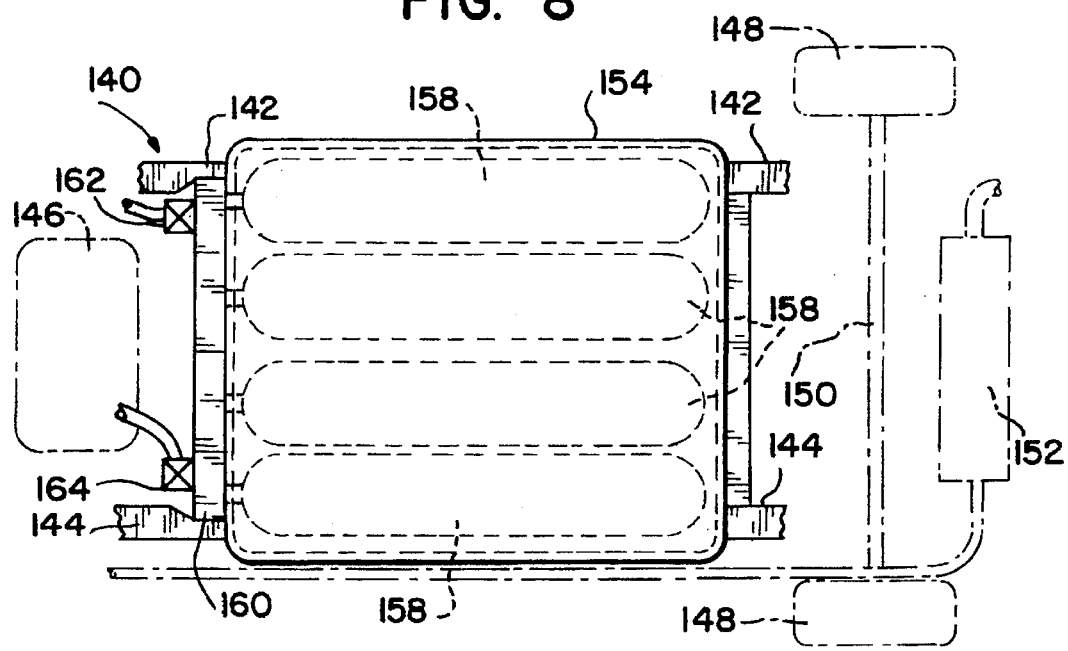
FIG. 8 is a top plan illustrative view of still another embodiment of the invention similar to FIG. 6 as applied to a front wheel drive vehicle.
Figure 9:
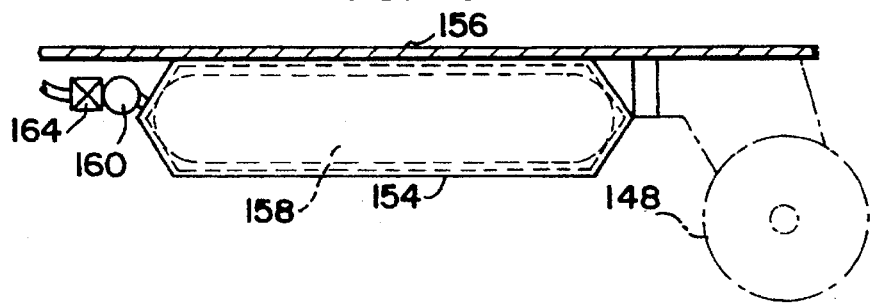
FIG. 9 is a side elevational view of the embodiment shown in FIG. 8.

As shown in FIGS. 8 and 9, the concept of a dual-fuel tank housing retaining a plurality of high pressure tanks of cylindrical composite construction may also be employed in a front wheel drive vehicle. The frame for such a vehicle is designated generally by the numeral 140, and the same is again shown as including side rails or members 142, 144 and appropriate cross members as required. The engine 146 is connected through an appropriate transaxle or the like to drive the front wheels (not shown). Again, rear wheels 148 are mounted upon opposite ends of the rear axle 150, with a muffler and appropriate exhaust system 152 also being provided beneath the vehicle.

As with the embodiment of FIGS. 6 and 7, a fuel tank housing 154 of composite material construction is mounted in a manner similar to that described above with respect to FIGS. 1-7 so as to comprise an integral part of the vehicle frame by interconnection with the side rail members 142, 144 and by appropriate fixing to the floor 156. Cylindrical high pressure tanks 158 of appropriate composite material as discussed above are maintained within the fuel tank housing 154 and are interconnected with each other by an appropriate manifold 160. As with the embodiment of FIGS. 6 and 7, an appropriate inlet valve 162 allows for the charging of the cylindrical tanks 158, while a single outlet valve 164 provide for passage of the gas from the tanks 158 to the engine 146. Of course, the valves 162, 164 are interconnected with the manifold 160.

It will be appreciated that, in the case of a front wheel drive vehicle, it is preferred that a single fuel tank housing 154 house all of the cylindrical tanks 158, and no configuring of the fuel tanks housing 154 is necessary to accommodate the drive shaft.

Figure 10:
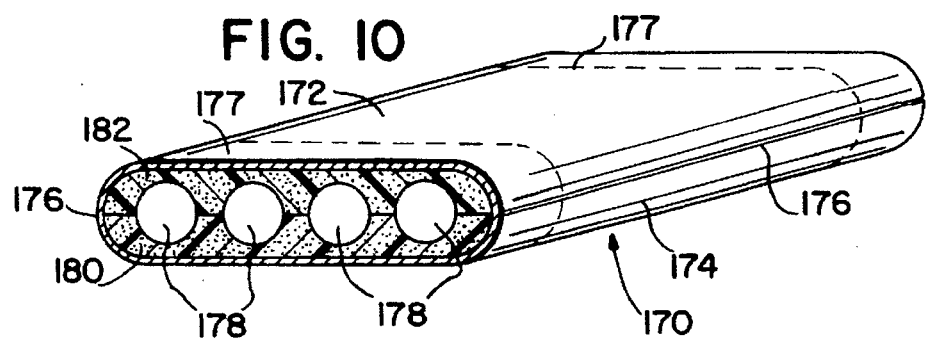
FIG. 10 is a perspective view, partially broken away, of the tank assembly showing the partial nesting of the cylindrical composite tanks within the dual-fuel tank.

With reference now to FIG. 10, it can be seen that a fuel tank assembly of the type employed in the embodiments of FIGS. 1-9 is designated generally by the numeral 170. As shown, tank halves 172, 174 of a clam shell design are configured to receive a plurality of composite tanks 178 therein and then to be closed by means of an appropriate weldment 176 extending about the periphery of the tank assembly. The composite tanks 178 are of the nature described above, having a cylindrical mid section with hemispherical or torispherical end caps. Those skilled in the art will appreciate that the manifolds 130, 160 are interconnected with the composite tanks 178 at the hemispherical end portions because for a common tank thickness the stresses at the hemispherical end are typically one half the stresses imparted to the cylindrical tank portion interposed therebetween. Accordingly, any intrusion into the tank has significantly less structural impact upon the integrity of the tank at the hemispherical end sections than it would at the cylindrical body portion.

The composite tanks 178 may be received in nests 180, 182 as shown at selected locations, i.e., at both ends and middle. The foam nests may be of any suitable foam or shock absorbing material that are encased or constructed so as not to react with the liquid secondary fuel. As presented above, the foam nests may be premolded to be received in the ends 177 of respective tank halves 172, 174 while nestingly receiving the composite tanks 178 and leaving space there between for the liquid fuel. Alternatively, the foam nests 180, 182 may comprise a plurality of spaced molded foam bands adapted to be received by the respective tank halves 172, 174 and the composite tanks 178. Clearly this structure could be applied to the previously described dual tanks.

Those skilled in the art will readily appreciate that use of high pressure cylindrical composite tanks such as the tanks 122, 158, 178 discussed above, allows for the fuel tank housings 118, 154, and 172, 174 to be made of a substantially thinner gauge metal than in the other embodiments. The result is a reduction in weight, material costs, and enhanced product reliability and durability.

A dual-fuel tank of the present invention tank is advantageous due to its ability to carry two different fuels simultaneously and its ability to act as a vehicle load-carrying member thus allowing its placement on the vehicle which would not otherwise be used for passengers and/or cargo. The fuel carrying capacity of such a tank is sufficient to obtain a range comparable to or greater than conventional single, liquid or gas-fueled vehicles. The tank would be ideal for vehicles such as delivery vehicles which operate into and out of urban areas where frequent re-fueling periods would not be desirable or economical.

While specific embodiments of the invention have been shown and described in detail to illustrate the application and the principles of the invention, certain modifications and improvements will occur to those skilled in the art upon reading the foregoing description. It is thus understood that all such modifications and improvements have been deleted herein for the sake of conciseness and readability but are properly within the scope of the following claims.

We claim:

1. A dual-fuel tank assembly for a vehicle, comprising:
    a fuel tank housing having a plurality of cylindrical pressure tanks therein for holding a gaseous fuel for the vehicle;
    means for securing said pressure tanks within said housing to leave space around said pressure tanks for holding a liquid fuel therein; and
    means for mounting said tank housing to the vehicle constructed to act as a structural member for the vehicle, said mounting means comprising a pair of channel members extending from opposite ends of said fuel tank housing, said channel members engaging respectively associated ends of a vehicle side rail.

2. A dual-fuel tank assembly for a vehicle according to claim 1, wherein said cylindrical pressure tanks are constructed of a fiber reinforced composite material.

3. A dual-fuel tank assembly for a vehicle according to claim 1, wherein said cylindrical pressure tanks comprise filament wound structures.

4. A dual-fuel tank assembly for a vehicle according to claim 1, wherein said means for securing comprises a foam member partially interposed between said cylindrical tanks and said tank housing.

5. A dual-fuel tank assembly for a vehicle according to claim 4, wherein said foam member nestingly receives said cylindrical tanks.

6. A dual-fuel tank assembly for a vehicle according to claim 1, further comprising a manifold interconnecting said plurality of cylindrical pressure tanks having inlet and outlet valves connected to said manifold.

7. A dual-fuel tank assembly for a vehicle according to claim 1, wherein said tank housing is of generally rectangular cross section and is constructed of stainless steel.

8. A dual-fuel tank assembly for a vehicle, comprising:
    a tank housing positioned within side rails of a frame of a vehicle, said tank housing maintaining a plurality of gas fuel pressure tanks therein and having space around said tanks for containing liquid fuel;
    channel members extending from opposite ends of said tank housing and being securely engaged to respective ends of said side rails on opposite sides; and
    means for securing said tank housing to a floor of the vehicle.

9. A dual-tank assembly for a vehicle according to claim 8, wherein said pressure tanks are interconnected to a common manifold, said manifold having valve means for passing gas to and from said pressure tanks.

10. A dual-tank assembly for a vehicle according to claim 8, wherein said pressure tanks are cylindrical and fabricated from a fiber reinforced composite material.

11. A dual-fuel tank assembly for a vehicle according to claim 8, wherein said pressure tanks are nestingly received within said tank housing.

12. A dual-fuel tank assembly according to claim 9, wherein said securing means comprises an elongated member traversing said tank housing and being welded to both said tank housing and the floor.

13. A dual-fuel tank assembly according to claim 12, wherein said securing means further comprises a pair of straps encircling said tank housing and being secured to the floor at opposite ends thereof.

14. A duel-fuel tank assembly according to claim 13, wherein said tank is of substantially rectangular cross section.

15. A duel-fuel tank assembly according to claim 14, wherein said straps and said elongated member are orthogonal to each other.

16. A dual-fuel tank assembly according to claim 15, wherein said tank is stainless steel construction.

* * * * *